US008805163B2

(12) United States Patent
Rajagopalan

(10) Patent No.: US 8,805,163 B2
(45) Date of Patent: Aug. 12, 2014

(54) NETWORK STORAGE DEVICE AND METHOD

(75) Inventor: Arun V Rajagopalan, Huntingdon Valley, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 13/354,791

(22) Filed: Jan. 20, 2012

(65) Prior Publication Data
US 2013/0188926 A1  Jul. 25, 2013

(51) Int. Cl.
H04N 9/80   (2006.01)
H04N 5/932  (2006.01)
H04N 5/935  (2006.01)
G06F 13/00  (2006.01)
G06F 21/00  (2013.01)

(52) U.S. Cl.
USPC ............. 386/248; 386/212; 386/213; 705/50; 711/154

(58) Field of Classification Search
USPC ................... 386/248, 212, 213, 229, E5.001; 341/50; 348/E5.007, E5.112, E7.056; 375/E7.088, E7.211; 705/50; 707/E17.007, E17.032; 711/154; 702/224

See application file for complete search history.

(56) References Cited

U.S. PATENT DOCUMENTS

| | | | |
|---|---|---|---|
| 6,172,621 B1 * | 1/2001 | Iwata | 341/50 |
| 2006/0200412 A1 * | 9/2006 | Fahrny et al. | 705/50 |
| 2006/0200558 A1 * | 9/2006 | Sherer et al. | 709/224 |
| 2007/0106852 A1 * | 5/2007 | Lam et al. | 711/154 |
| 2008/0138033 A1 * | 6/2008 | Rodriguez et al. | 386/92 |
| 2010/0017443 A1 * | 1/2010 | Xie et al. | 707/201 |

* cited by examiner

Primary Examiner — Daquan Zhao
Assistant Examiner — Syed Hasan
(74) Attorney, Agent, or Firm — Banner & Witcoff, Ltd.

(57) ABSTRACT

A network device can manage the storing of content. In one aspect, the content may be managed to prevent the storing of multiple versions of the same content. A deduplication process may be performed by comparing digests generated at user devices. Based on the comparison of the digests, the network device can efficiently and effectively manage the retrieving and storing of content.

19 Claims, 15 Drawing Sheets

|  | Seg 1 | Seg 2 | Seg 3 | Seg 4 | Seg 5 | Seg 6 | Seg 7 | Seg 8 | Seg 9 | Seg 10 | Seg 11 | Seg 12 |
|---|---|---|---|---|---|---|---|---|---|---|---|---|
| Digests from Gateway 1 | 235 | 987 | 210 | 976 | 657 | 476 | 95 | 396 | 611 | 467 | 115 | 333 |
| Digests from Gateway 2 | 909 | 711 | 523 | 235 | 987 | 210 | 976 | 657 | 476 | 95 | 396 | 611 |

FIG. 15A

| Time | Transmit | Gateway1 | Playback |
|---|---|---|---|
| 0:00:01 | 1 |   |   |
| 0:00:02 | 2 | 1 |   |
| 0:00:03 | 3 | 1 |   |
| 0:00:04 | 4 | 1 |   |
| 0:00:05 | 5 | 2 |   |
| 0:00:06 | 6 | 2 |   |
| 0:00:07 | 7 | 2 |   |
| 0:00:08 | 8 | 3 |   |
| 0:00:09 | 9 | 3 |   |
| 0:00:10 |   | 3 |   |
| 0:00:11 |   | 4 |   |
| 0:00:12 |   | 4 |   |
| 0:00:13 |   | 4 |   |
| 0:00:14 |   | 5 |   |
| 0:00:15 |   | 5 |   |
| 0:00:16 |   | 5 |   |
| 0:00:17 |   | 6 |   |
| 0:00:18 |   | 6 |   |
| 0:00:19 |   | 6 |   |
| 0:00:20 |   | 7 |   |
| 0:00:21 |   | 7 | 1 |
| 0:00:22 |   | 7 | 2 |
| 0:00:23 |   | 8 | 3 |
| 0:00:24 |   | 8 | 4 |
| 0:00:25 |   | 8 | 5 |
| 0:00:26 |   | 9 | 6 |
| 0:00:27 |   | 9 | 7 |
| 0:00:28 |   | 9 | 8 |
| 0:00:29 |   |   | 9 |

FIG. 15B

| Time | Transmit | Gateway1 | Gateway2 | Gateway3 | Gateway1 | Gateway2 | Gateway3 | Gateway1 | Gateway2 | Gateway3 | Playback |
|---|---|---|---|---|---|---|---|---|---|---|---|
| 0:00:01 | 1 |   |   |   |   |   |   |   |   |   |   |
| 0:00:02 | 2 | 1 |   |   |   |   |   |   |   |   |   |
| 0:00:03 | 3 | 1 | 2 |   |   |   |   |   |   |   |   |
| 0:00:04 | 4 | 1 | 2 | 3 |   |   |   |   |   |   |   |
| 0:00:05 | 5 |   | 2 | 3 | 4 |   |   |   |   |   | 1 |
| 0:00:06 | 6 |   |   | 3 | 4 | 5 |   |   |   |   | 2 |
| 0:00:07 | 7 |   |   |   | 4 | 5 | 6 |   |   |   | 3 |
| 0:00:08 | 8 |   |   |   |   | 5 | 6 | 7 |   |   | 4 |
| 0:00:09 | 9 |   |   |   |   |   | 6 | 7 | 8 |   | 5 |
| 0:00:10 |   |   |   |   |   |   |   | 7 | 8 | 9 | 6 |
| 0:00:11 |   |   |   |   |   |   |   |   | 8 | 9 | 7 |
| 0:00:12 |   |   |   |   |   |   |   |   |   | 9 | 8 |
| 0:00:13 |   |   |   |   |   |   |   |   |   |   | 9 |

NETWORK STORAGE DEVICE AND METHOD

FIELD OF ART

The features described herein generally relate to the architecture for and management of a network storage device such as a digital video recorder.

BACKGROUND

Users have grown accustomed to using their digital video recorders (DVRs) to record shows to watch later. Early DVRs stored recorded programs locally in hard drives, providing user playback options from the hard drive. These local hard-drive-based DVRs are well appreciated by users, but there is an ever-present demand for greater flexibility and functionality in how content is offered to, stored and managed for, users.

SUMMARY

Some of the various features described herein relate to network recording and deduplication of recorded content. In some embodiments, a network device manages the storing of recorded content received from devices over a network. The network recorder may manage the recorded content so as to avoid storing duplicates of the same recorded content, which may be recorded by the same user device or two or more different user devices. Further, the network recorder may be an over-the-top network recorder, which may not have access to the metadata of the content to be recorded.

According to an aspect, the network device may utilize digests generated at a user device to determine whether content is a duplicate. By utilizing digests generated at user devices, the network device may reduce the bandwidth used to record content or may manage the bandwidth used to record content by selecting different portions of the same content from different user devices. Also, the digests can be compared and the results of the comparison may be used to provide a resilient network recorder. That is, the network recorder can take content recorded by one user and provide it to another user who failed to properly record such content (e.g., where transmission of recorded content to the network storage device failed).

Furthermore, the digests used by the network recorder may be generated in a manner so as to address potential misalignment of content with respect to time. More specifically, because the same content may be recorded by two different users who start recording at different times, the digests disclosed herein may be generated so that the network recorder can still identify the content as being the same despite the misalignment.

In accordance with another illustrative embodiment, the disclosure herein relates to a method, including receiving, at a network computing device, one or more first digests derived from recorded content, where the one or more first digests originate from a first user device remote from the network computing device. The method may also include comparing the one or more first digests with one or more second digests to determine whether the first and second digests are derived from the same recorded content. If the recorded content is not presently stored in a storage of the network computing device, then the recorded content from the first user device or another user device is retrieved based on a result of the comparison. Additionally, the retrieved recorded content may be stored in the storage of the network computing device. Also, in accordance with another illustrative embodiment, the disclosure herein relates to a non-transitory computer-readable medium having instructions stored thereon that, when executed, cause a processor to perform methods such as the one described above.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

FIGS. 15A and 15B illustrate example processes for uploading recorded content to a network.

DETAILED DESCRIPTION

Figure 1:
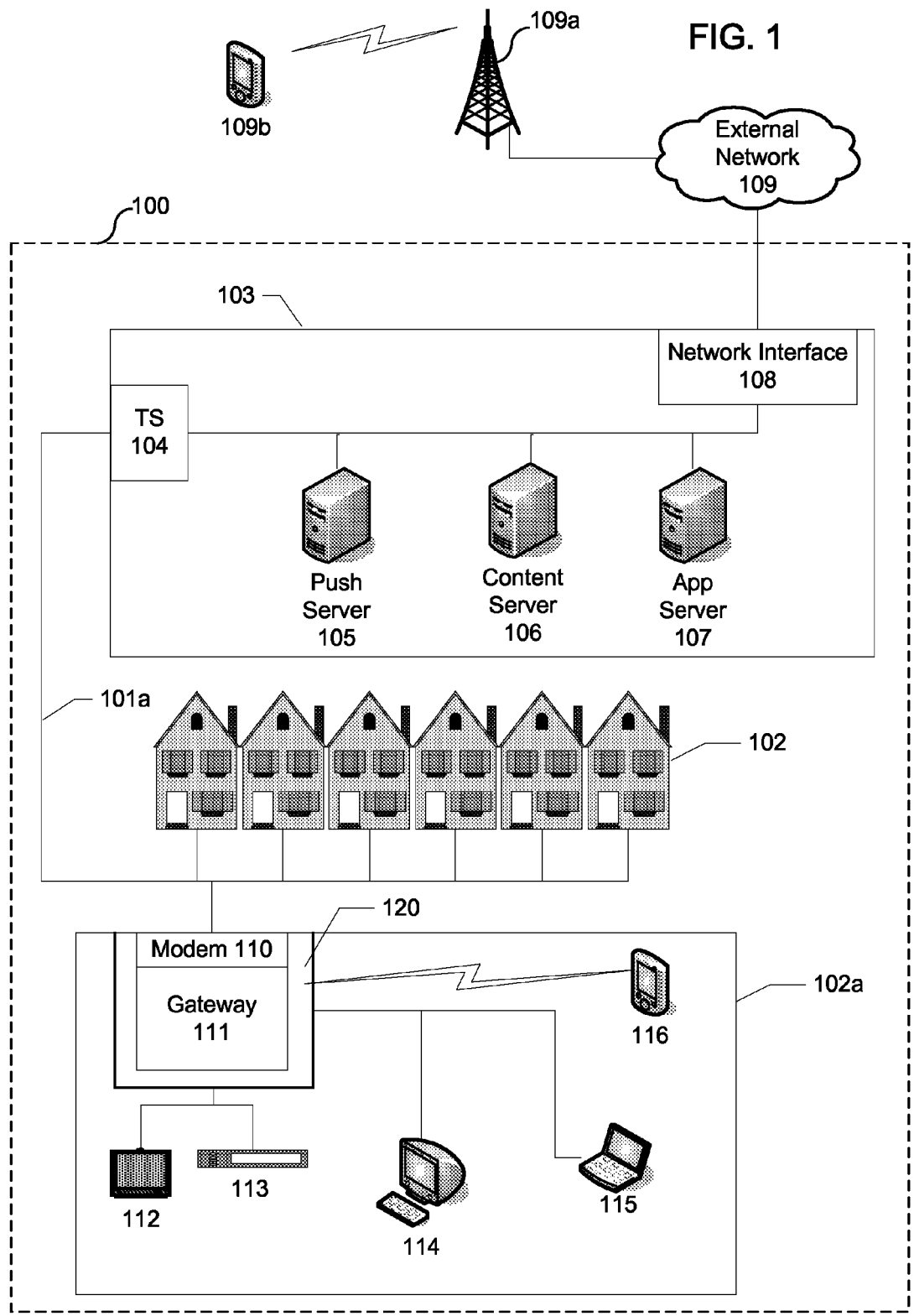
FIG. 1 illustrates an example information distribution or access network.

FIG. 1 illustrates an example information distribution network 100 on which many of the various features described herein may be implemented. Network 100 may be any type of information distribution network, such as satellite, telephone, cellular, terrestrial broadcast, wireless, etc. One example may be an optical fiber network, a coaxial cable network or a hybrid fiber/coax (HFC) distribution network. Such networks 100 use a series of interconnected communication lines 101a (e.g., coaxial cables, optical fibers, wireless, etc.) to connect multiple locations 102 to a central office or headend 103. The central office 103 may transmit downstream information signals onto the lines 101a, and each location 102 may have a receiver used to receive and process those signals.

There may be one line 101a originating from the central office 103, and it may be split a number of times to distribute the signal to various locations 102 in the vicinity (which may be many miles) of the central office 103. Herein, locations 102 may be any type of user premises, such as homes, businesses, institutions, etc. The lines 101*a* may include components not illustrated, such as splitters, filters, amplifiers, etc. to help convey the signal clearly, but in general each split introduces a bit of signal degradation. Portions of the lines 101*a* may also be implemented with fiber-optic cable, while other portions may be implemented with coaxial cable, other lines, or wireless communication paths.

The central office 103 may include an interface, such as a cable modem termination system (CMTS), which may be a computing device configured to manage communications between devices on the network of lines 101*a* and backend devices such as servers 105-107 (to be discussed further below). The interface 104 may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream channels or frequencies to be received by devices, such as modems at the various locations 102, and to receive upstream communications from those modems on one or more upstream channels or frequencies. The central office 103 may also include one or more network interfaces 108, which can permit the central office 103 to communicate with various other external networks 109. That is, the network interface 108 may include circuitry needed to communicate with one or more external networks 109 and their corresponding devices. These external networks 109 may include, for example, networks of Internet devices, telephone networks, cellular telephone networks, fiber optic networks, local wireless networks (e.g., WiMAX), satellite networks, and any other desired network. For example, the external network may include a cellular telephone network 109*a* and its corresponding cell phones 109*b*.

As noted above, the central office 103 may include a variety of servers 105-107 that may be configured to perform various functions, including providing content to locations 102, cell phones 109*b*, and other devices on the external networks 109. For example, the central office 103 may include a push notification server 105. The push notification server 105 may generate push notifications to deliver data and/or commands to the various locations 102 in the network (or more specifically, to the devices in the locations 102 that are configured to detect such notifications). The central office 103 may also include a content server 106. The content server 106 may be one or more computing devices that are configured to provide content to users in the locations 102. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting data such as television program listings information and generating a data download for electronic program guide listings. Another application server 107 may be responsible for monitoring user viewing habits and collecting that information for use in selecting advertisements. Another application server 107 may be responsible for formatting and inserting advertisements in a video stream being transmitted to the locations 102. And another application server 107 may be responsible for receiving user remote control commands, and processing them to provide an intelligent remote control experience.

An example location 102*a* may include an interface 120. The interface 120 may comprise a device 110, such as a modem, which may include transmitters and receivers used to communicate on the lines 101*a* and with the central office 103. The device 110 may be, for example, a coaxial cable modem (for coaxial cable lines 101*a*), a fiber interface node (for fiber optic lines 101*a*), or any other desired modem device. The device 110 may be connected to, or be a part of, a gateway interface device 111. The gateway interface device 111 may be a computing device that communicates with the device 110 to allow one or more other devices at the location 102*a* to communicate with the central office 103 and other devices beyond the central office 103, such as those devices connected to the external networks 109. The gateway 111 may be a set-top box (STB), digital video recorder (DVR), computer server, or any other desired computing device. The gateway 111 may also include local network interfaces (not shown) to provide communication signals to devices at the location 102*a*, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
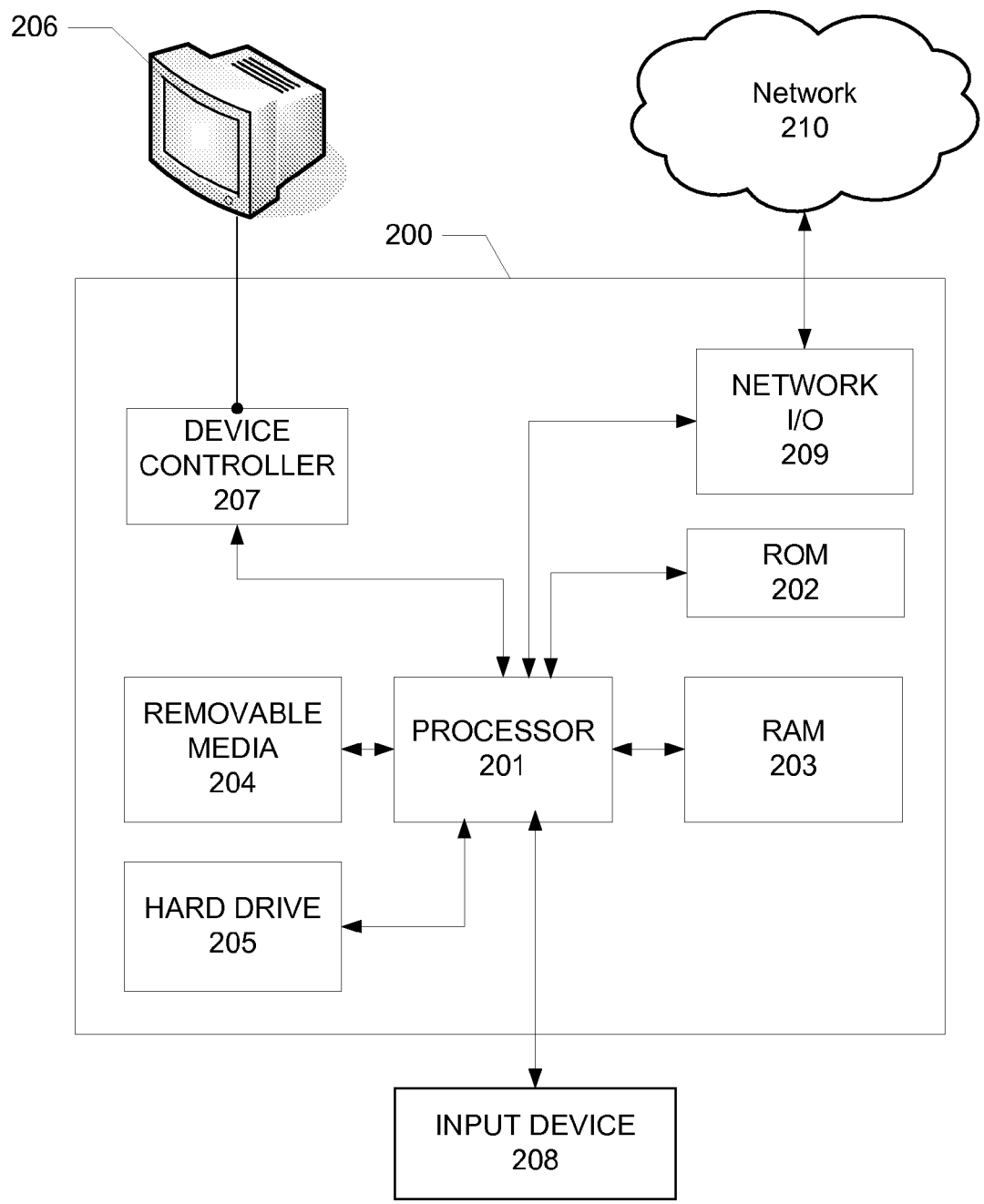
FIG. 2 illustrates an example computing device on which at least some of the various elements described herein can be implemented.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (e.g., a network card) to communicate with a network 210. The network interface 209 may be a wired interface, wireless interface, or a combination of the two. In some embodiments, the network interface 209 may include a modem (e.g., a cable modem), and the network 210 may include the communication lines 101*a* discussed above, the external network 109, an in-home network, a provider's wireless, coaxial, fiber, or hybrid fiber/coaxial distribution system (e.g., a DOCSIS network), or any other desired network.

Various features described herein offer alternative methods for managing the recording and accessing of digital data over a network. In some embodiments, users accessing content from the central office 103 or another content storage facility or location 102 may choose to record the content and store the recorded content at a designated location that differs from the source of the content. For example, one such user may be a viewer who is watching a television program being transmitted from the central office 103.

Figure 3:
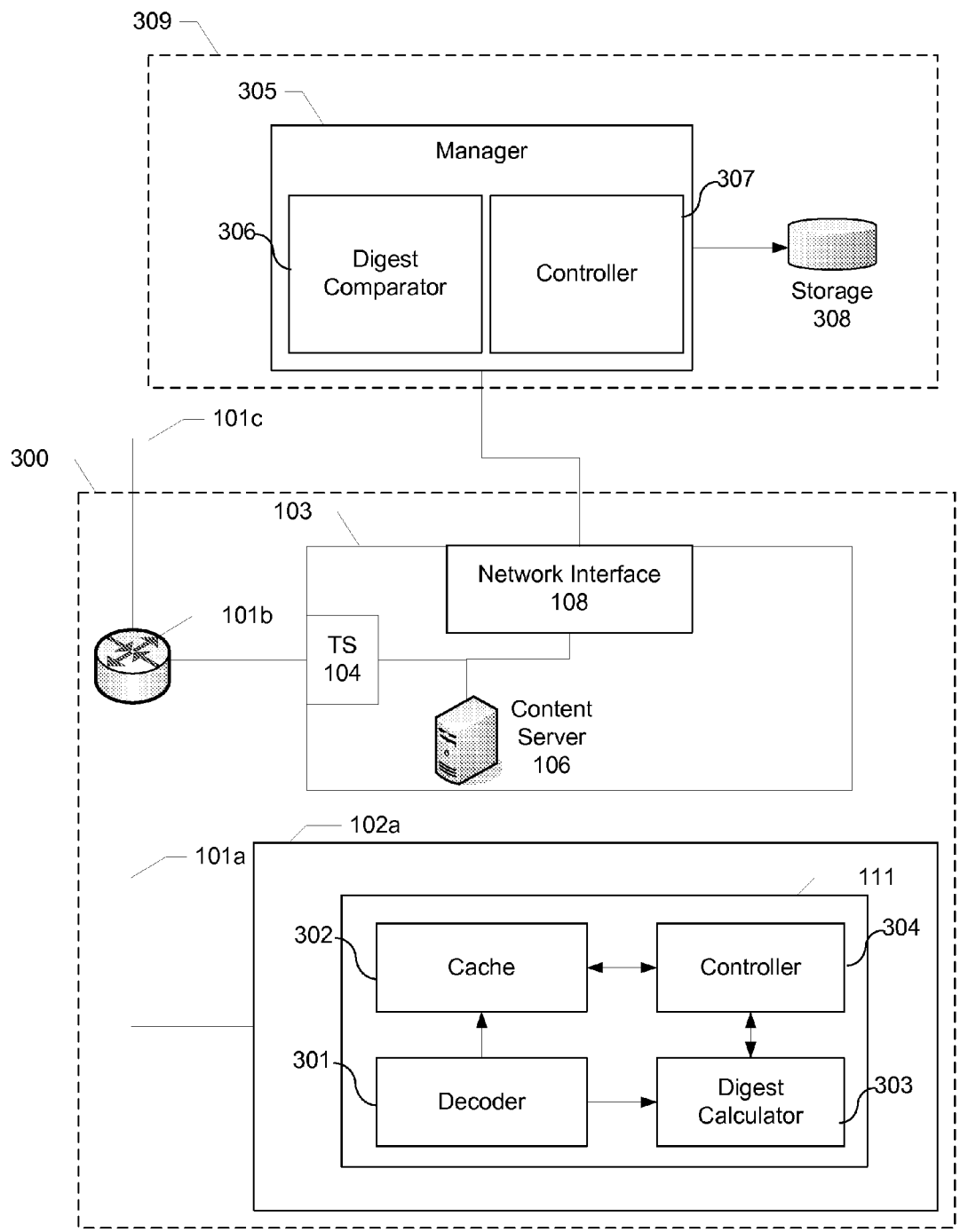
FIG. 3 illustrates an example over-the-top network architecture on which features described herein may be implemented.

FIG. 3 illustrates an example system including, an external network 309, such as the external network 109 discussed above, and a simplified version of an information distribution network 300, such as the network 100 discussed above, to highlight some of the components used to record content at a designated location. It should be understood that FIG. 3 represents an example embodiment, and that, in other embodiments, the external network 309 may include all of the components of the local office 103. Using the system of FIG. 3, in one embodiment, a user may employ recording of content (e.g., video, audio, data, etc.) on a network recording and/or storage device. For example, the user may employ network digital video recording (nDVR). In the nDVR options, a user may select content such as video programs (e.g., linear broadcast or multicast programs, on demand programs, etc.) for recording, and the recorded content can be stored at a designated location, instead of, or in addition to, storing the recorded content at the content server 106 or at a device in the user's location 102. The FIG. 3 example shows some components similar to those illustrated in FIG. 1, such as the central office 103, interface 104, location 102, gateway 111, etc., while illustrating additional components.

Several of the additional components may be part of or associated with the gateway 111, or another user device (e.g., smartphone, display device, set top box, computer, etc.). The decoder 301 may receive content that a user wishes to record, and decodes the content. The decoded content may then be stored in a cache 302. The decoded content may also be provided to a digest generator 303. The digest generator 303 may be configured to calculate a digest or signature for the decoded content. For example, the digest generator 303 may calculate an MD5 checksum. Moreover, the digest generator 303 may calculate a digest for portions of content, such as for each block of data recorded. In other words, in a case in which video is being recorded, the digest generator 303 may calculate a digest for each one second block of audio and video data. The number of digests calculated for a given piece of recorded content may vary, however, the accumulation of the digests is preferably smaller in size than that of the content being recorded. Furthermore, the number of digests to be utilized may be set by a controller 304. The controller 304 may also be responsible for determining what data is to be recorded, when the data is to be recorded, and where to store the recorded data.

The digest generator 303 is configured to generate digests based upon the content that the digests represent so that specific digests are generated for a particular content. That is, the digest generator 303 should always produce the same digests for the same pieces of content, and conversely, should produce different digests for different pieces of content (or at least with minimal odds of two pieces of content resulting in the same digest). Further, a digest generator 303 at one location 102 may be configured to generate the same digest as another digest generator 303 at another location 102 when each of the digest generators 303 receives a version of the same content. For example, if a user at one location 102 chooses to record a TV show and a user at another location 102 chooses to record the same TV show, the digest generator 303 at each location 102 may be configured to generate the same digests.

FIG. 3 also shows other additional components that may be used to transfer the digests and recorded content upstream to the external network 309 during recording and to transfer the recorded content downstream during playback. Such components include a router 101*b* which may direct the upstream digests and recorded content to the external network 309 instead of the central office 103. Thus, it is not necessary for the upstream digests and recorded content to pass through the central office 103. Further, additional communication lines 101*c* (e.g., wireless links) may be used to transfer the digests and recorded content from the router 101*b* to the external network 309. The additional communication lines 101*c* may include components not illustrated, such as splitters, filters, amplifiers, etc. Portions of the lines 101*c* may also be implemented with fiber-optic cable, while other portions may be implemented with coaxial cable, other lines, or wireless communication paths.

Other devices may be part of the external network 309, which may be a packet switched network, such as the Internet. As shown in FIG. 3, the external network 309 may include a manager 305. The manager 305 may be used by an over-the-top provider. An over-the-top provider may be an entity that provides a service over the top of another entity's network. For example, the manager 305 may belong to an over-the-top provider and may communicate with a location 102 utilizing portions of the network 300, which may be operated by another provider.

The manager 305 may include a digest comparator 306 and a controller 307. The digest comparator 306 may be configured to compare digests received and to determine whether the digests are the same or not. Thus, the digest comparator 306 may determine whether the content is the same as other content received. The digest comparator 306 may compare digests received from the same location 102, from different locations 102, or from other network locations. Also, the digest comparator 306 may compare a digest, e.g., a digest currently being received, to other digests currently being received or other digests previously received.

In some embodiments, the controller 307 may control the number of digests that are compared by the digest comparator 306. For example, the controller 307 may control the digest comparator, so that it compares every other digest that the recorder manager 305 receives. Alternatively, the controller 307 may communicate with the controller 304 of the gateway 111 to control how many digests are generated, transmitted, etc.

Further, based on a result of the comparison, the controller 307 may determine whether to store the content or to store a pointer to previously stored content in storage 308. The storage 308 may be located internally within the manager 305 and/or elsewhere in the network. Further, the storage 308 may include one or more types of storage, such as ROM, RAM, flash, etc. Also, the storage 308 may include parallel recording and reading capabilities to support thousands of simultaneous reads and writes, which can be useful if, for example, thousands of households serviced by the manager 305 all desire to record shows being transmitted at a particular time, e.g., this evening.

Additionally, the controller 307 may be configured to select one or more of the locations 102 to receive content from, and to communicate with devices at locations 102 to control the input of the recorded content according to its selection. The controller 307 may select the location that transmits the content the fastest or over the most secure connection. The controller 307 may also decide to distribute the load, so that a portion of the content is received from one location 102 while another portion of the same content is received from another location 102. The load can be distributed so that it is balanced (e.g., evenly distributed over a number of locations 102) or unbalanced (e.g., unevenly distributed over the number of locations 102).

The manager 305 may perform deduplication of content or prevent duplicates of content from being stored. For example, if the manager 305 receives the same content from two different locations 102, the manager 305 can store just one copy of the content and send that content to both locations 102 at a later time. Thus, the manager 305 may reduce costs and space associated with storing.

Additional features and advantages of the manager 305 will be appreciated in light of the description of its operation below. One advantage is that the manager 305 may be configured to deduplicate content stored on storage 308 in a case where data from one location 102 and data from another location 102 include the same content (e.g., are the same television program), but are different due to location specific factors, such as advertisements, run times, etc. Furthermore, the manager 305 may reduce the bandwidth utilized for recording by preventing multiple locations 102 from transferring the same content upstream.

The components illustrated in the figures herein are merely examples, and can be altered, combined, and/or subdivided in any desired manner to still achieve results described herein.

Figure 4A:
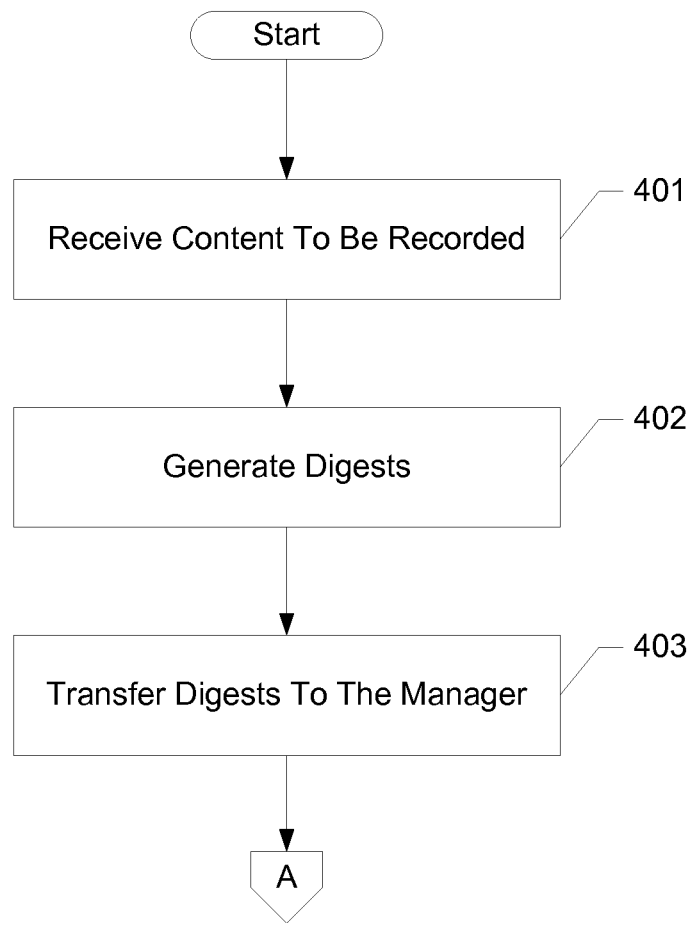
FIGS. 4A and 4B illustrate an example method of network recording.
Figure 4B:
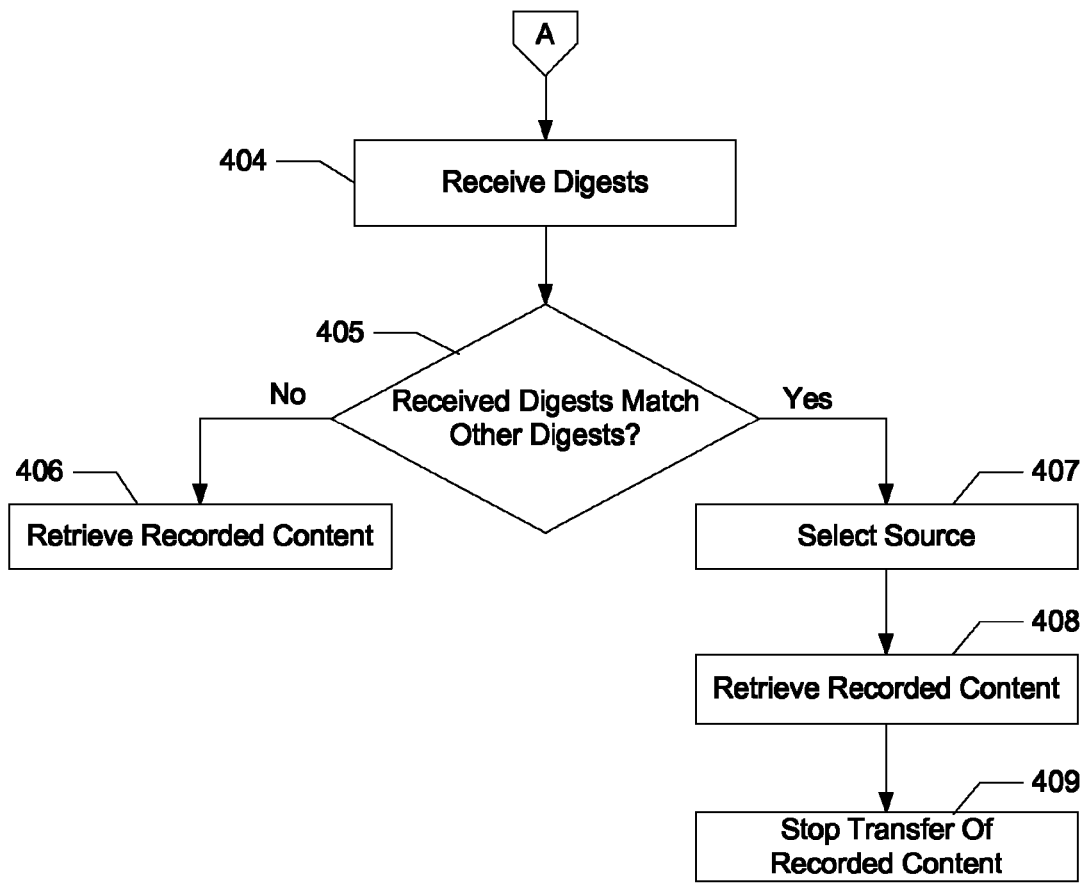

FIGS. 4A and 4B illustrate an example process for network recording. The example processes of FIGS. 4A and 4B may be used for deduplicating or avoiding duplication during network recording.

The steps in FIG. 4A may, but need not, all be performed by the same computing device, such as the gateway 111 (or another device, e.g., the computing device 200 described above).

In step 401, a user device may receive content that the user may wish to be recorded. The content may be received, for example, through the information distribution network 100. Such content may be data, audio, video, or audio-video content, such as a television program. A user may select which content is to be recorded or may set instructions (e.g., dates, times, channels) for directing a device, e.g., the controller 304 of the gateway 111, to retrieve content to be viewed and/or recorded. When received, the content may be decoded by a decoder 301 of the user device, e.g., gateway 111 or another user device. After content to be recorded is received, the process proceeds to step 402. The content may also be recorded and stored in the cache 302; however this is not necessary. That is, the content to be recorded might not be stored locally at a user device.

In step 402, the digest generator 303 may generate one or more digests to represent the content. The digests may be generated by sampling the data of the content. The sampling rate may be a predetermined sampling rate or a sampling rate set by a user of the system (e.g., a system operator or administrator). The number of digests generated may also depend on the type and size of the content for which the digests are being generated. For example, if the content is a minute long video and a digest is set to be generated for every second long segment, then 60 digests would be generated. Preferably, the number of digests generated is such that some or all of the digests together uniquely identify the content. That is, because different content can contain similar material at times, it is preferred that a number of digests are used, so that different content produces different digests. In at least one embodiment, the digests may include MD5 checksums generated from the content. However, a digest may include any data string that may be used to identify the content.

The digests generated in step 402 may be transferred to the manager 305 in step 403. Step 403 may be performed after all of the digests are generated for a particular content (e.g., after step 402 is complete), or may be performed so that one or more digests are transferred to the manager 305 soon after they are generated in step 402 (i.e., before step 402 is complete). A controller 307 of the gateway 111 (or another device) may determine when to transfer the digest and how many to transfer. The controller 307 may also package identification information along with the digests to be transferred to the manager 305. Such identification information may include a user or user device ID, a gateway ID, address information (e.g., an IP address), etc.

The process may proceed to step 404 of FIG. 4B, after one or more of the digests are transferred in step 403. The steps in FIG. 4B may, but need not, all be performed by the same computing device, such as the manager 305 (which, in turn, can be implemented using the computing device 200 described above).

In step 404, the manager 305 receives the digests through a network from a device, e.g., through the external network 109 from the gateway 111 at a location 102 (and similarly, from a plurality of other users gateways). The manager 305 may transfer the received digests to a controller 307 for initial processing, including an authentication process for confirming that the digest is being sent from an acceptable source. Or, the manager 305 may transfer the received digests to the digest comparator 306.

In step 405, the received digests are compared with one or more other sets of digests. The other digests may be received from another device, e.g., a gateway 111 at another location 102, or may be digests generated based on content previously stored in the storage 308. The digest comparator 306 may compare some or all of the digests received in step 404 with the other digests to determine whether there is a match. If a match is found, then the digest comparator 306 may conclude that the content of the received digests and the content of the other digests are the same (e.g., two devices are recording or requested to record the same program). In some embodiments, a threshold may be set to evaluate whether there is a match or not. The threshold may be a predetermined threshold or may depend on the number of digests being compared. For example, a threshold of 90% may be set, so that when 90% of the digests match the other digests, the content is determined to be the same. Step 405 may finish when a certain number of digests are found to match or not match without having to compare all of the digests. For example, if 90% of the digests must match for the digest comparator 306 to determine that the content is the same and the first 11% of the digests do not match, then step 405 may finish. Vice versa, if 90% of the digests must match for the digest comparator 306 to determine that the content is the same and the first 90% do match, then step 405 may also finish.

If the digest comparator 306, or another device, determines that the received digests do not match another set of digests ("No" at step 405), then the process proceeds to step 406. In step 406, the manager 305 may send instructions so that it may retrieve the recorded content. More specifically, the manager 305 may instruct the device which sent the digests that were received in step 404, or an associated device, to transfer the desired content upstream to the manager 305. Upon receiving the instructions, the gateway 111, or another user device, may transfer the desired content to the manager 305, which may then store the desired content in the storage 308. Alternatively, the controller 304 in the gateway 111, which sent the digests that were received in step 404, may be set to transfer the desired content if it does not receive a response from the manager 305. In this case, the controller 304 sends the desired content unless it receives instructions not to. Also, in some embodiments, the controller 304 in the gateway 111, which sent the digests that were received in step 404, may be set to transfer the desired content to the manager 305 after a given time without any instructions from the manager 305. While the description above explains that the desired content may be transmitted by the gateway 111, the gateway 111 is just one example device. In other embodiments, another device may transmit digests and the desired content to the manager 305. Further, If the digest comparator 306 determines that the received digests do match another set of digests ("Yes" at step 405), then the process proceeds to step 407. In step 407, the manager 305 may select a source to supply the desired content. If the match is with a set of digests that were previously stored in storage 308, then the manager 305 may control the device (e.g., gateway 111) that sent the digests received at step 404 to stop it from sending content. However, if the match is with a set of digests received from another gateway 111, then the recorder manager 305 may select either the gateway 111 that sent the digests received at step 404, the gateway 111 of the other set of digests, or both to supply the desired content. Furthermore, where the digests match more than one other set of digests, the recorder manager 305 may select any combination of gateways 111 to supply the desired content.

To perform step 407, the manager 305 may rely on one or more methods for selecting a supplier for supplying the desired content. In one embodiment, at step 407, the manager 305 may determine the speed at which the desired content can be provided from each of the gateways 111. The manager 305 may make this determination by instructing those gateways 111 that are receiving and/or recording the desired content to transfer the desired content to the manager 305, and then evaluating which gateway 111 is sending the desired content the fastest or in the preferred format. The manager 305 may then select the gateway 111 to supply the entirety of the desired content. Or, the manager may choose a faster gateway 111 to supply the majority of the desired content and a slower gateway 111 to supply the remainder of the desired content. In this manner, the manager 305 may improve the speed in which the desired content is transferred upstream and stored into the storage 308.

If a device (e.g., gateway 111) selected for sending some or all of the desired content fails (e.g., turns off during the transfer) or slows down during the transfer, the manager 305 may retrieve the desired content from another gateway 111 that was previously not selected. Also, if the desired content is retrieved from multiple gateways 111, the manager may stop the retrieval from all devices once the entirety of the desired content is received. The gateways 111 may send different segments of the desired content according to a fixed or changing pattern as instructed by the manager 305. The manager 305 may also request different gateways 111 to send different parts of the same segment of desired content. In some embodiments, the desired content may be received from one gateway 111 in one direction and from another gateway 111 in a reverse direction. In such cases, the transfers from both gateways 111 are stopped when all bytes of the desired content have been received.

In another embodiment, the manager 305 may select a supplier of the desired content based on bandwidth. That is, the manager 305 may determine the bandwidth of each of the channels from which the desired content may be received. The manager 305 may then choose to select the gateway 111, having the communication channel with the largest bandwidth, to supply the desired content. Alternatively, the manager 305 may choose to distribute the load, and thus, may select two or more gateways 111 to supply the desired content. More specifically, the manager 305 may request different gateways 111 to provide different segments of the desired content. For example, the manager 305 may divide the upload responsibility up based on proportional bandwidth availability at each gateway, and request a majority of segments of the desired content from a gateway 111, having a larger bandwidth, and may request the remaining segments of the desired content from another gateway 111, having a smaller bandwidth, in accordance with their respective bandwidth availability. For example, if one gateway has twice the available upstream bandwidth as another, then it may be instructed to upload ⅔ of the program, while the other gateway is instructed to upload ⅓ of the program.

The load can also be distributed to account for comparably slow upload speeds. Distributing the load by uploading different segments of the same content from different gateways 111 reduces the time that it takes content to be available for viewing (e.g., available for playback). Referring to FIGS. 15A and 15B, the advantages of distributing the load during the uploading of content can be realized. In FIG. 15A, an example is shown in which only one device (e.g., Gateway1) is utilized for uploading content. FIG. 15A shows that segments 1-9 of the content are transmitted (e.g., broadcast) one segment per second beginning at a first time (0:00:01). Meanwhile, Gateway1 begins recording the segments at a second time (0:00:02), which is one second after the first time. Here, Gateway1 has an upload speed (e.g., recording speed) equal to about one third of the download speed (e.g., broadcast speed or playback speed). Accordingly, the earliest that the content can start to be played-back is at 21 seconds (0:00:21).

In contrast, FIG. 15B shows the advantages when the segments 1-9 are distributed over three different devices (e.g., Gateway1, Gateway2, and Gateway3). The three gateways in FIG. 15B each have an upload speed that is one third of their download speed. However, because the segments are distributed among the three gateways, different segments can be recorded at the same time. Accordingly, all of the segments will finish being recorded in 13 seconds (e.g., at 0:00:13). Thus, the content may be played-back as early as five seconds after the broadcasting of the segments (e.g., at 0:00:05).

After selecting the source in step 407, the manager 305 retrieves the desired content from the selected source in step 408. The "desired content" may include content that is buffered in and/or streamed through a user device (e.g., the gateway 111), and thus, it is not required that the desired content be stored in the user device (although it may be). In step 408, the manager 305 may send instructions to retrieve the desired content. More specifically, the manager 305 may instruct the gateway 111, which sent the digests that were received in step 404, to transfer the desired content upstream to the manager 305. Upon receiving the instructions, the gateway 111 may transfer the desired content to the manager 305, which may then store/record the desired content in the storage 308. Alternatively, the controller 304 in the gateway 111 may transfer the desired content to the manager 305 after a given time without any instructions from the manager 305.

In step 409, the manager 305 may instruct one or more gateways 111 that were not selected in step 407 to stop or cancel the process of transferring the desired content to the manager 305 and/or to stop recording the content in their local cache 302. In order to perform step 409, the manager 305 may send instructions to those gateways 111 that it has not selected instructing them to stop the transferring of desired content upstream and/or to cancel plans to transfer the desired content upstream. In some embodiments, the manager 305 may also instruct the unselected gateways 111 to delete content stored in their local cache 302.

Further, in some embodiments, step 409 may include instructing some of the devices (e.g., gateways 111) that were selected in step 407 to stop transferring the desired content upstream. For example, when multiple gateways 111 are selected in step 407, the manager 305 may subsequently determine that only one or some of the selected gateways 111 are needed to transmit (e.g., upload) the desired content. That is, the manager 305 may determine that the probability of correctly and completely receiving the content from one or some of the selected gateways 111 is high, and therefore, may choose to stop the remaining selected gateways 111 from further sending the content upstream.

Additionally, once the manager 305 completely receives content from a gateway 111, it may instruct the gateway 111 to delete the content from its local cache 302. Where the content is completely received from multiple gateways 111, the manager 305 may instruct each gateway 111 to delete the corresponding content from its local cache 302. Thus, upon successfully recording content onto a network recorder, the local cache 302 of a gateway 111 may be deleted to create additional space for future recording. These instructions to delete content within a local cache 302 may be provided after each completion of recording content, whether digests match or not. In other words, instructions can be sent to delete recorded content within a local cache 302 after, for example, either step 406 or step 409.

It should be understood that the steps of FIGS. 4A and 4B are just one example, and that steps may be added, eliminated, and/or reordered. For example, steps 408 and 409 may be switched, so that step 409 is performed to stop the transfer of desired content from an unselected gateway 111 before the desired content is retrieved from a selected gateway in step 408. Also, a step may be added to store the content in a user device (e.g., gateway 111), while the manager 305 compares the digests. However, such a storing step is not required as the user device may transmit the content upstream without storing it locally.

Figure 5:
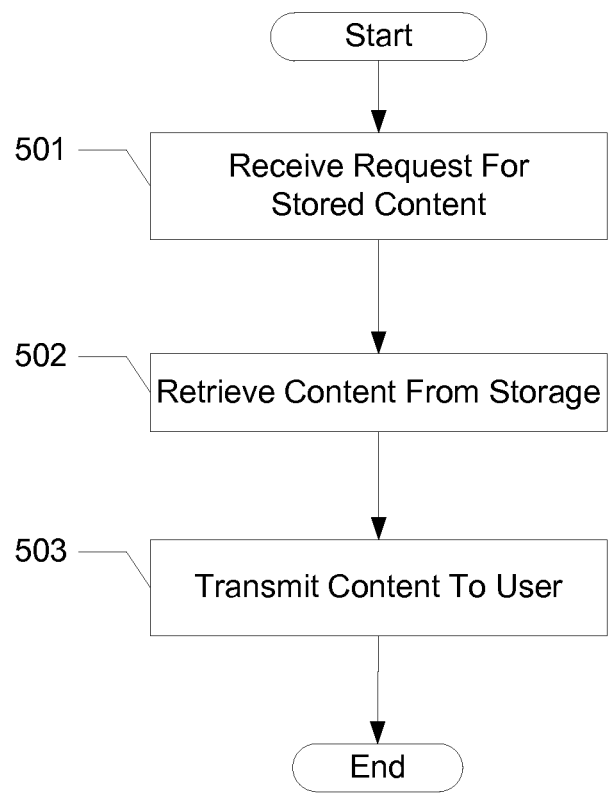
FIG. 5 illustrates an example process for providing content to a user device from a network device.

FIG. 5 is an example process for providing recorded content stored in a network recorder computing device to a user device. The steps in FIG. 4B may, but need not, all be performed by the same computing device, such as the manager 305 (which, in turn, can be implemented using the computing device 200 described above).

One reason for using a network recorder is so that recorded content can be stored remotely at a location having a greater capacity to store content. For example, referring to FIG. 3, the storage 308 on the external network 109 may have a greater storage capacity than the gateway 111 at the location 102a. However, when the recorded content is stored remotely at a network recorder, users should be able to access the recorded content at a later time. FIG. 5 illustrates example steps that may be performed to allow a user to receive content stored by a network recorder or storage device at a later time. The process in FIG. 5 begins with step 501 in which a request for content is received. The request may be received by the controller 307 of the manager 305. The request may contain content information (e.g., a content ID, author name, title, etc.) that allows the controller 307 to identify the content desired. The request may also contain user information (e.g., a user ID, user name, IP address, etc.) that identifies the user that is sending the request. This user information may be used by the controller 307 to determine if the user is authorized to receive the requested content.

Next, in step 502, the controller 307 may search the storage 308 for the requested content using content related information. Once the controller 307 locates the requested content, the controller 307 may copy, if needed, the content. The controller 307 may copy the requested content without damaging or deleting the content, so that it can also be provided to another requesting user if necessary.

In step 503, a version of the requested content is transmitted to the requesting user, for example as a digital stream and/or downloadable file. Here, step 503 may use the user information to determine which user (or gateway or device) to send the requested content to.

Figure 6:
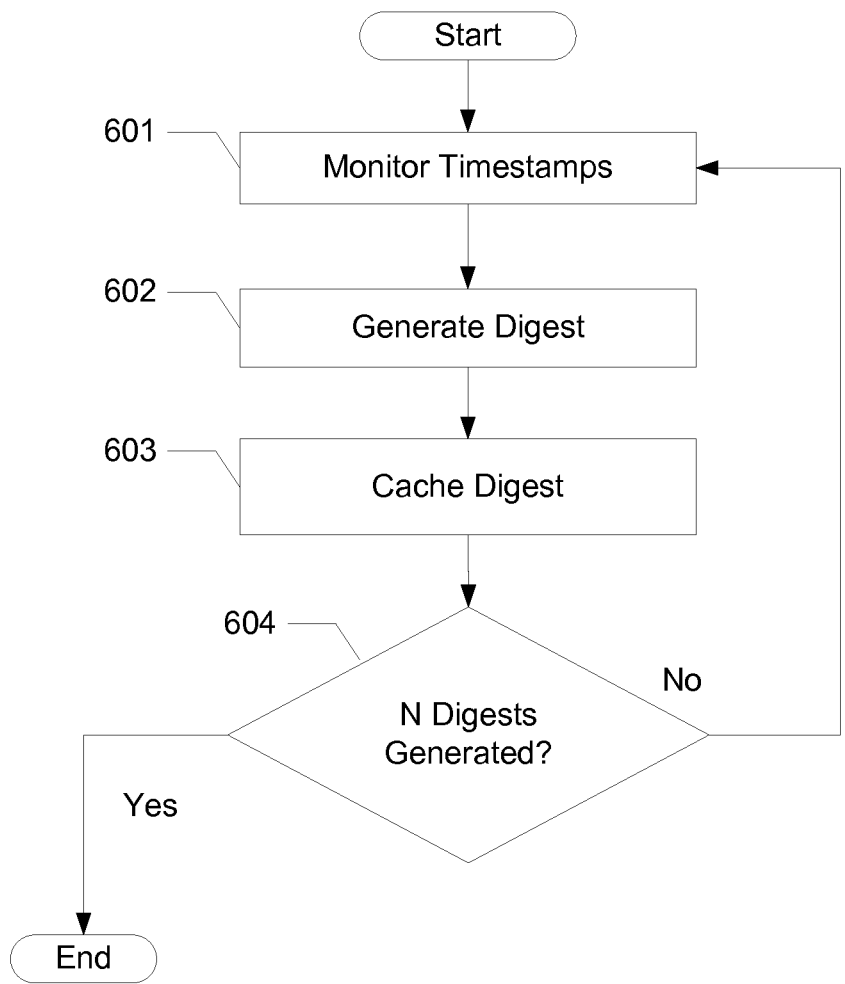
FIG. 6 illustrates an example process for generating digests.

FIG. 6 is an example process for generating digests. In one aspect, the steps in FIG. 6 may be performed as part of step 402 of FIG. 4A. The steps of FIG. 6 may, but need not, all be performed by the same computing device, such as the gateway 111 (which, in turn, can be implemented using the computing device 200 described above).

When two different devices (e.g., DVRs, gateways 111) begin recording the same content at different times, it may become difficult to compare the content. More specifically, misalignment due to the different recording times may cause different digests to be generated and compared even though the content is the same. In some embodiments, the potential misalignment of recorded content may be taken into account. The steps in FIG. 6 present one process for generating digests that takes misalignment into account.

Typically, every frame or every periodic frame of video content includes a timestamp, which may mark a time that the particular frame was transmitted (e.g., broadcast, streamed, multicast, etc.) or a time within the duration of the video content. Thus, the same frames of the same video content have the same timestamps. Therefore, the process of FIG. 6 utilizes timestamps to account for potential misalignment (other criteria may also be utilized). Herein, timestamps are described as standard times for the ease of explanation. However, it should be understood that the timestamps do not have to be standard times, and instead, may be any indication of time relative to some reference point (e.g., relative to the start of a video). For example, where the content comprises MPEG video, the timestamps may be a program clock reference (PCR), a presentation time stamp (PTS), or a decode time stamp (DTS).

The process for generating a digest as shown in FIG. 6 begins with step 601. In step 601, timestamps of the recorded content are monitored. Step 601 may be set to search for particular timestamps, such as those on the hour, 5 minutes past the hour, 10 minutes past the hour, etc. When a desired timestamp is found, the particular piece of recorded content having that timestamp (e.g., a video frame or fragment) is further analyzed or processed at step 602. For example, the timestamp on each frame of video content may be compared with a set time of 8:00 AM to identify the video frame having a timestamp representing 8:00 AM. Then, when a match is found, the frame having a timestamp representing 8:00 AM is provided for further processing at step 602.

In step 602, a digest is generated using the piece of recorded content (e.g., video frame or fragment) having a matching timestamp. In one aspect, an MD5 checksum may be generated as the digest. An MD5 checksum may be generated by the MD5 message-digest algorithm, which is a well-known algorithm that transforms bits of data into a unique digest or checksum, and therefore, further description of the MD5 checksum is omitted herein. Although the MD5 message-digest algorithm is identified as an appropriate algorithm here, various other algorithms may be used to generate the digest from the recorded content. The purpose of the algorithm is to generate a digest that is unique to a particular piece of data or that is unlikely to be generated from different data, so any algorithm that accomplishes this purpose may be implemented.

Furthermore, the digest does not have to be generated solely from the recorded content having the matching timestamp. In some embodiments, the digest may be generated from a block of data encompassing the matching timestamp. For example, a single digest may be generated from the frame that has the matching time stamp and the 3 frames immediately following it (or preceding it, or a combination thereof).

In step 603, the generated digest may be cached. That is, the generated digest may be stored for later use, such as transmission upstream. For example, the digest may be stored in cache 302 of the gateway 111 in which the digest is generated. This may be done so that several digests can be packaged together before sending them upstream for comparison or other processing.

In step 604, the process may determine whether a particular number N (where 'N' is any positive integer) of digests are generated. In some embodiments, the number N may be a predetermined number. As explained above, several digests may be compared at the manager 305 in order to determine whether the recorded content is the same. The more digests that are compared, the more robust the determination can be. However, there is a trade-off in that as more digests are sent, more time may be needed to do the comparison and more bandwidth may be used to send the digests. Thus, the number N of digests to be generated may be chosen in accordance with these factors.

In other embodiments, the number N of digests to be generated may be based upon the overall size of the recorded content. For example, the number N may be 6 where the recorded content is one hour long and timestamps are searched for every 10 minutes. As explained above, one reason to use digests is to reduce the bandwidth used in comparing the recorded content. To further this objective, the number N of digests to be generated should generally have a combined data size that is less than the data size of the recorded content.

If it is determined that the number N of digests to be generated is reached ("Yes" at step 604), then the process of FIG. 6 may end (and the N digests may be transferred to the manager 305 in step 403 of FIG. 4A). In contrast, if it is determined that the number N of digests to be generated is not reached ("No" at step 604), then the process proceeds to step 601 and the steps of FIG. 6 are repeated. Accordingly, the steps of FIG. 6 are repeated until N digests are generated. However, each time that step 601 is performed, a different timestamp may be searched for. For example, in the first iteration of step 601, a timestamp of 8:10 AM may be searched for, and in the second iteration of step 602, a timestamp of 8:20 AM may be searched for.

It should be understood that the steps of FIG. 6 are just one example, and that one or more steps may be eliminated and/or reordered. For example, step 603 may not be performed, and instead the generated digest may be transferred directly to the manager 305.

Figure 7:
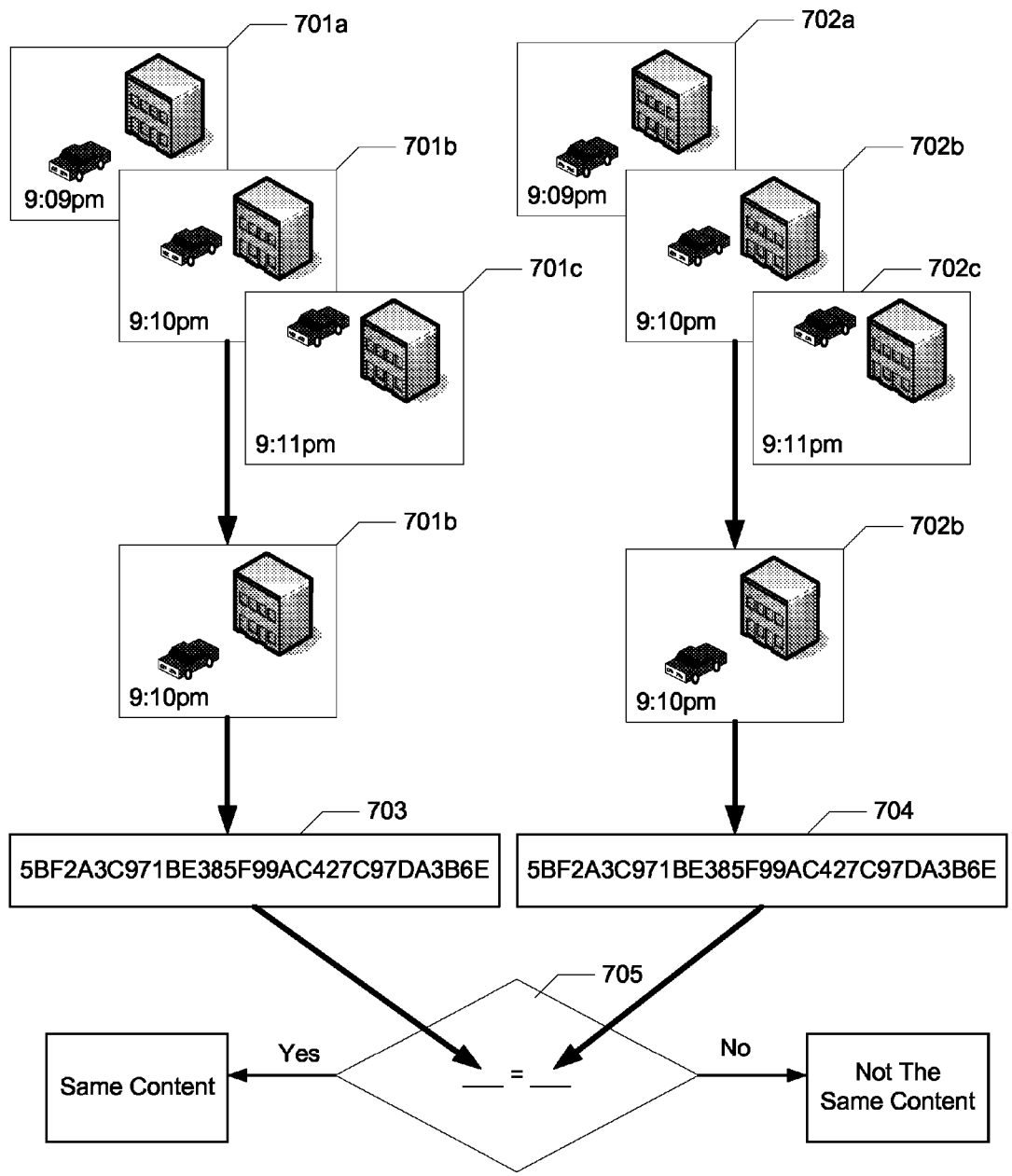
FIG. 7 illustrates a high-level diagram of an example process for generating and comparing digests.

FIG. 7 illustrates a high-level diagram of an example process for generating and comparing digests. In one aspect, FIG. 7 may be a high-level diagram of the process described with respect to FIG. 6. As shown in FIG. 7, first recorded content (e.g., frames or fragments) 701*a-c* and second recorded content (e.g., frames or fragments) 702*a-c* (both the same program) may be obtained by two different user devices. Each of the frames may contain a timestamp (e.g., 9:09 pm, 9:10 pm, 9:11 pm), which may indicate when the corresponding frame was transmitted or received. This timestamp may be provided by the initial source/provider of the content or by the user device.

FIG. 7 shows that for each of the first recorded content 701*a-c* and the second recorded content 702*a-c*, a frame having a specific timestamp is detected. Here, the timestamp searched for corresponds to 9:10 pm. Thus, the frame 701*b* having the 9:10 pm timestamp among the frames of the first recorded content 701*a-c* and the frame 702*b* having the 9:10 pm timestamp among the frames of the second recorded content 702*a-c* are detected. The data of the detected frames 701*b* and 702*b* are then processed, such as inputted into a digest calculation algorithm, to produce a first digest 703 and a second digest 704, respectively. Here, the first and second digests 703 and 704 may be 128 bit digests as generated, for example, by the MD5 message-digest algorithm (shown as 32 digit hexadecimal numbers in FIG. 7). Then, in block 705, the first digest 703 and the second digest 704 are compared. If the two digests have the same value (e.g., the 128 bits are the same), then it is determined that the first recorded content 701*a-c* and the second recorded content 702*a-c* are the same. In contrast, if the two digests have different values (e.g., the 128 bits are not the same), then it is determined that the first recorded content 701*a-c* and the second recorded content 702*a-c* are different.

Figure 8:
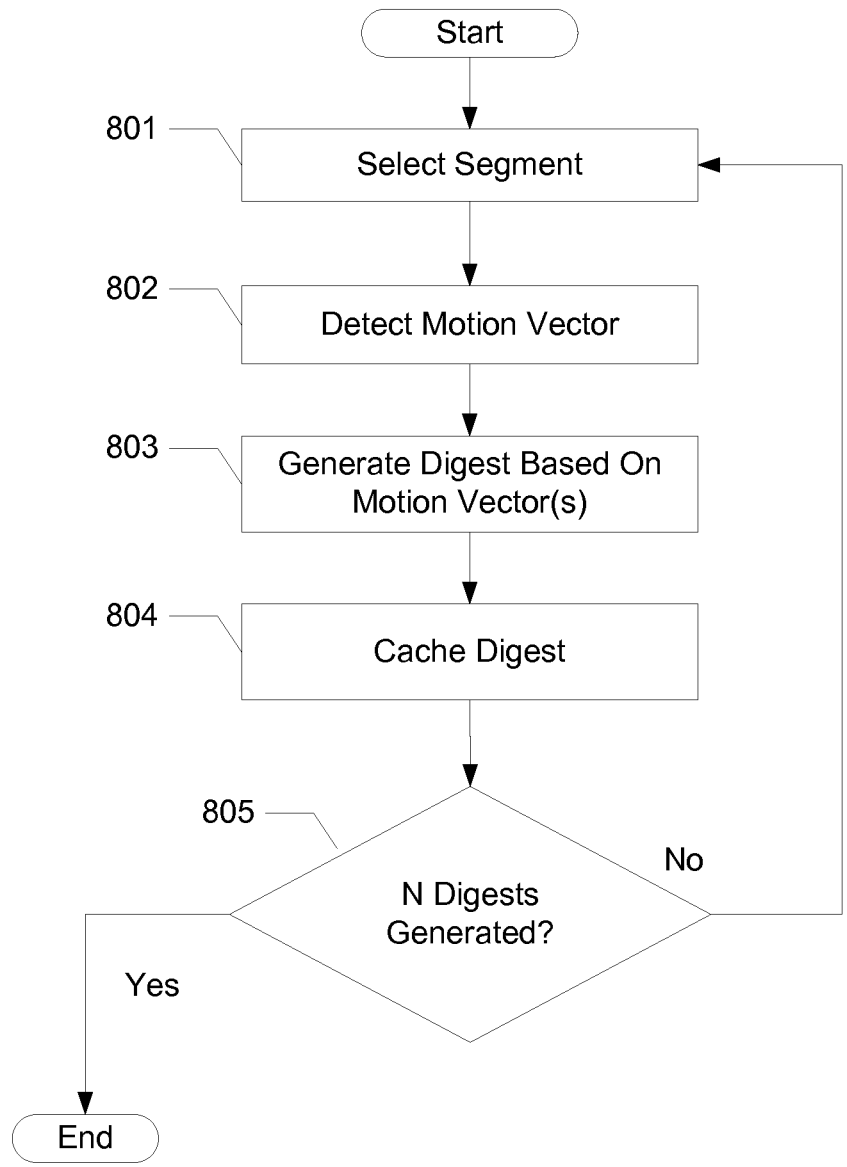
FIG. 8 illustrates another example process for generating digests.

FIG. 8 is another example process for generating digests. In one aspect, the steps in FIG. 8 may be part of step 402 of FIG. 4A. The steps of FIG. 8 may, but need not, all be performed by the same computing device, such as the gateway 111 (which, in turn, can be implemented using the computing device 200 described above).

Referring to FIG. 8, the process for generating a digest begins with step 801. In step 801, a segment of the content (e.g., a fragment, frame, or series of video frames) is selected. The size of the segment (e.g., fragment, frame, or number of video frames) may be predetermined or may be based upon the overall size of the recorded content. Further, step 801 may be controlled to select the segment at a particular time. That is, the segment may be selected in response to an activated clock signal, which may be received from the manager 305 or generated at the gateway 111. For example, step 801 may select the next 10 video frames of the recorded content once a clock signal is activated. In some embodiments, the clock signal may be activated in response to a real time. For example, the clock signal may be activated when manager 305 or gateway 111 detects that the real time is 5:00 AM.

In step 802, the selected segment is processed to detect motion vectors. Motion vectors may represent the movement of objects in images over a period of time (e.g., across a number of video frames). They are detected by first comparing data in the different frames to identify like elements, by performing, for example, edge detection or pattern recognition. Then, the movement of those like elements is tracked to generate motion vectors. Step 802 may employ various suitable algorithms to detect the motion vectors.

In some embodiments, the motion vectors detected may be limited to a specific area of the frame. In other words, only the center area of the frames may be analyzed in order to detect the motion vectors. In particular, the center area of the frame may be desirable because borders surrounding the frames may skew the motion vector detection scheme. The center area is also desirable because watermarks are typically inserted around the edges (e.g., a station ID in the top left corner), and these watermarks may be elements from which the motion vectors are detected. Still in other embodiments, the area in which the motion vectors are detected may change. For example, the left side of the frame may be analyzed for motion vectors in one portion of the segment and the right side of the frame may be analyzed for motion vectors in a second portion of the segment. The areas in which the motion vectors are to be detected may be defined according to a predetermined pattern. Preferably, the same pattern would be used in each device used to record content.

Furthermore, step 802 may evaluate the detected motion vectors and discard unwanted data. For example, the detected motion vectors may include motion vectors having a zero value for static elements. Because static elements commonly appear in frames, motion vectors having a zero value may be common, and therefore, different content may produce similar motion vectors. To account for this phenomenon, step 802 may discard motion vectors having a zero value.

Additionally, in some embodiments, the motion vectors may be detected in advance and provided with the content received by a device, such as the gateway 111. In such embodiments, rather than detecting the motion vectors, step 802 is performed to extract data representing the motion vectors from the content.

In step 803, the detected motion vectors, alone or in combination with other data, are used to generate a digest. In some embodiments, data, such as an MD5 checksum, generated from the motion vectors may be used as the digest. Although an MD5 checksum is identified as an example digest here, various other algorithms may be used to generate the digest from the motion vectors. The purpose of the algorithm is to generate a digest that is unique to a particular piece of data or that is unlikely to be generated from different data, so any algorithm that accomplishes this purpose may be implemented.

In some embodiments, the motion vectors themselves may serve as the digest. In such cases, step 803 may not be performed or may serve to select one of a number of motion vectors to be used as the digest.

Steps 804 and 805 may be performed in a similar manner as steps 603 and 604, respectively, or may be otherwise adapted to implement the method of FIG. 8.

It should be understood that the steps of FIG. 8 are just one example, and that one or more steps may be eliminated and/or reordered. For example, step 804 may not be performed, and instead the generated digest may be transferred directly to the manager 305.

Figure 9:
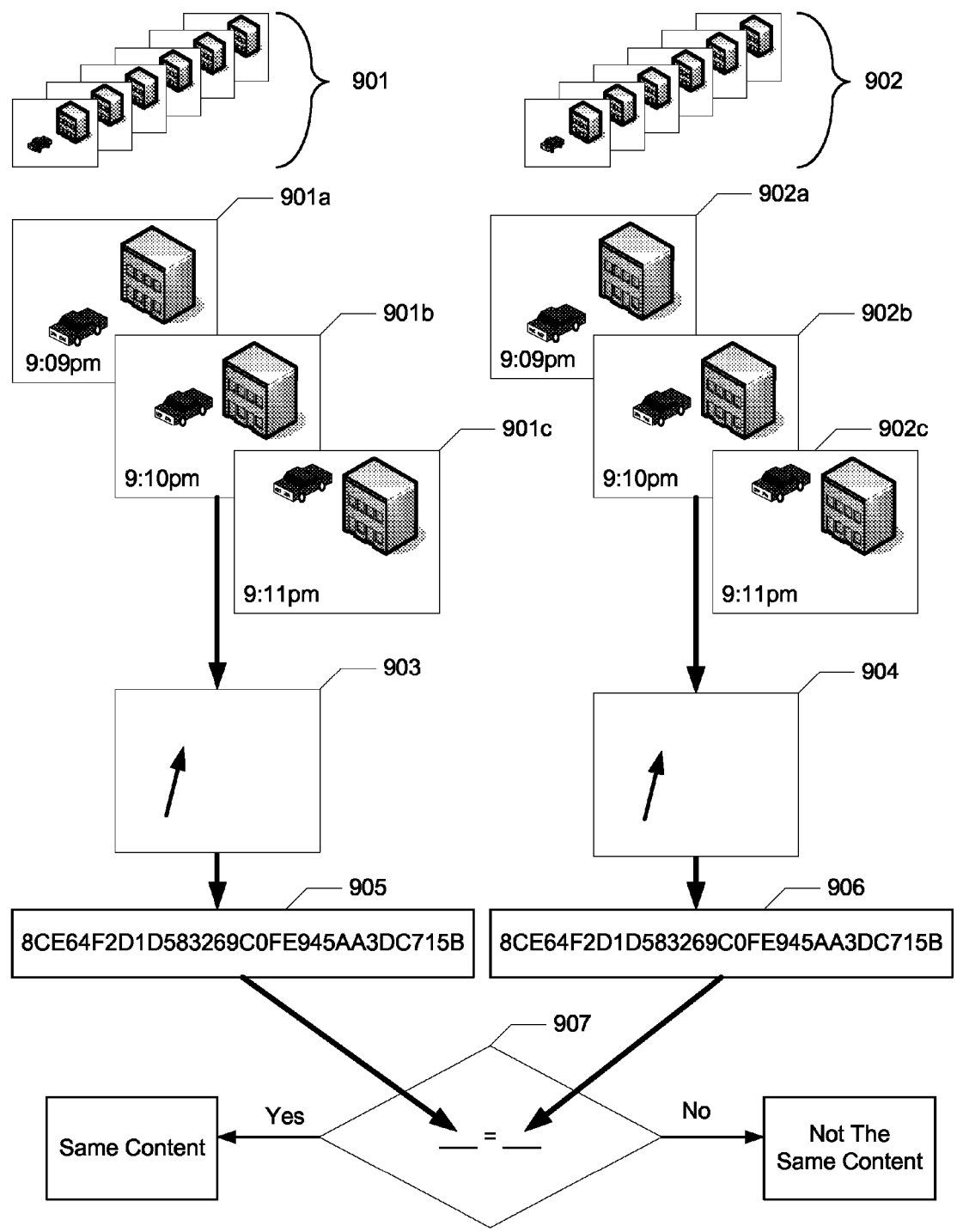
FIG. 9 illustrates another high-level diagram of an example process for generating and comparing digests.

FIG. 9 illustrates a high-level diagram of an example process for generating and comparing digests. For illustrative purposes only, FIG. 9 illustrates a high-level diagram of the process described with respect to FIG. 8. As shown in FIG. 9, first content 901 and second content 902 (which may be recorded content) may be obtained by two different user devices. A segment may then be extracted from each of the first and second content. Referring to FIG. 9, a first segment 901a-c, including three frames 901a, 901b, and 901c, may be extracted from the first content 901, while a second segment 902a-c, including 902a, 902b, and 902c, may be extracted from the second content 902. Motion vectors may then be detected in both the first segment 901a-c and the second segment 902a-c by comparing like elements in the different frames of the different segments. As shown in FIG. 9, the car in frame 901a moves up in frame 901b and moves up again in frame 901c. Likewise, the car in frame 902a moves up in frame 902b and moves up again in frame 902c. The movement of the car can be detected and characterized as motion vectors 903 and 904. The data of the detected motion vectors 903 and 904 may then be inputted into a common algorithm to produce a first digest 905 and a second digest 906, respectively. Here, the first and second digests 905 and 906 may be, for example, 128 bit digests as generated by the MD5 message-digest algorithm (shown as 32 digit hexadecimal numbers in FIG. 9). Then, in block 907, the first digest 905 and the second digest 906 are compared. If the two digests have the same value (e.g., the 128 bits are the same), then it is determined that the first content 901 and the second content 902 are the same. In contrast, if the two digests have different values (i.e., the 128 bits are not the same), then it is determined that the first content 901 and the second content 902 are different.

Figures 10, 11:
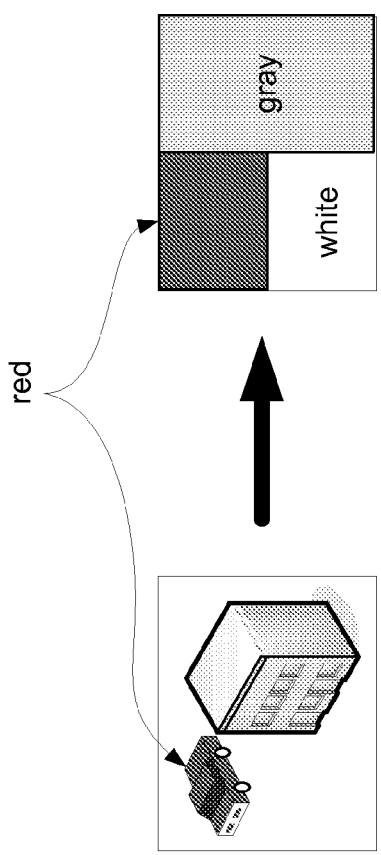
FIG. 10 illustrates an example process for comparing digests.
FIG. 11 illustrates a high-level diagram of an example process used to compare content.

FIG. 10 shows yet another way to account for possible misalignment. The process in accordance with FIG. 10 may be performed by the manager 305. Thus, it is not necessary to generate digests from timestamps or motion vectors as shown in FIGS. 6-9. Rather, digests can be generated from defined segments of the content, such as segments representing every five frames starting from the start of a video, and sent to the manager 305. The manager 305 can then take into account misalignment by comparing digests from one version of content (e.g., digests sent from one gateway 111) to previous or subsequent digests from another version of content (e.g., digests sent from another gateway 111). If the manager 305 finds a match or a predetermined number of matches, then the manager 305 may thereafter shift the digests accordingly so that corresponding digests are compared.

Referring to FIG. 10, digests of 12 segments received from two different devices labeled as Gateway 1 and Gateway 2 are shown. Here, although the digests are generated from the same content, the digests are misaligned. Specifically, digests from the Gateway 2 trail the digests from the Gateway1 by three segments. However, the manager 305 may be configured to compare the digest representing the first segment received from one of the devices (e.g., Gateway 1) with more than one segment received from another of the devices (e.g., Gateway 2). For example, the manager 305 may compare the first segment digest from Gateway 1 with the first segment digest from Gateway 2. Upon determining that this comparison is not a match, the manager 305 may then compare the first segment digest from Gateway 2 with the second segment digest from Gateway 2. Determining that the comparison is not a match again, the manager 305 may then compare the first segment digest from Gateway 1 with the third segment digest from Gateway 2. Still determining that the comparison is not a match, the manager 305 then compares the first segment digest from Gateway 1 with the fourth segment digest from Gateway 2. At this time the manager 305 determines that there is a match. In response to this determination, the manager 305 shifts future comparisons between the segment digests from Gateway 1 and the segment digests from Gateway 2. That is, the manager 305 controls the digest comparator 306 so that it next compares the second segment digest from Gateway 1 with the fifth segment digest from Gateway 2.

FIG. 11 illustrates a high-level diagram that demonstrates yet another process that may be used to compare content. As shown in FIG. 11, a frame or image may be converted into a highly quantized image. This conversion may be performed by quantizing the luminance or chrominance data of an image to generate an abstract, highly-quantized image. One way to obtain a highly-quantized image is to use only some of the high order discrete cosine transform (DCT) coefficients of the content. An image may be divided into predetermined blocks (e.g., blocks of 8×8 pixels) and DCT coefficients of each block may be converted into fewer values. In this manner, the luminance and chrominance data can quantized on a block by block basis to produce a compressed image. Herein, a highly-quantized image may be any compressed image that is compressed by, for example, more than 50% of its original amount of data.

Referring to FIG. 11, the frame including a car and building can be converted into a highly-quantized image, including three regions—a red region, a white region, and a gray region. The conversion may be performed by the gateways 111 or other devices, and then digests may be generated from the highly-quantized image(s). For example, coefficients may be taken from the data of the highly-quantized image(s) and used as digests or used to calculate digests. These digests may then be sent to the manager 305 for comparison as described above.

In one or more other embodiments, the conversion may be performed by the manager 305. The manager 305 may then compare a sequence of highly-quantized images from one version of content with a sequence of highly-quantized images from another version of content (e.g., from another device).

If the sequences match, then the manager 305 may determine that the content is the same and perform steps similar to steps 407 through 409 described above or may determine that the content is at least similar enough to proceed with generating digests from timestamps or motion vectors.

Alternatively, if the sequences match, then the manager 305 may determine that further comparison is needed to confirm the match. The manager 305 may then instruct the devices that sent the highly-quantized images to send digests for further comparison. These digests can be generated from the raw data of the recorded content (e.g., timestamps and motion vectors do not have to be used). By identifying similar highly-quantized images first, the determination of duplicate content may be more efficient and/or accurate.

In some embodiments, the process of converting frames or images described above with reference to FIG. 11 may only be done on select frames. For example, only certain frames in a video, such as I frames or reference pictures may be converted and compared.

Figure 12:
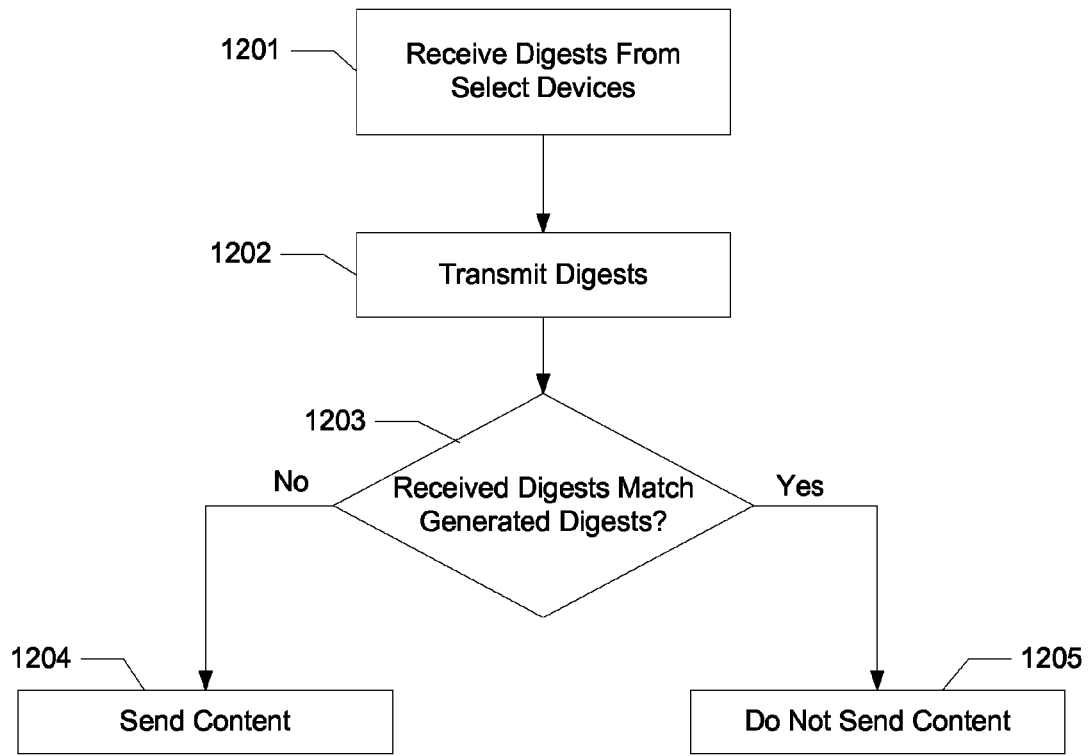
FIG. 12 illustrates another example method for network recording.

FIG. 12 illustrates another example process for network recording. In this process the primary digest comparison responsibilities are shifted from the manager 305 to one or more devices, such as user devices (e.g., gateways 111). Accordingly, the manager 305 manages a digest feed, which includes a set of digests generated from content that is currently being viewed and/or recorded, and distributes the digests of the digest feed to the devices (e.g., gateways 111) for comparison. Digest feeds can be used to reduce the volume of digests that would be received in the process of FIG. 4B. In particular, using a digest feed, the manager 305 can reduce the computing power used by the digest comparator 306. For example, the manager 305 having a digest feed may reduce the maximum digest input rate that the digest comparator 306 supports. The manager 305 having a digest feed may also reduce the upstream bandwidth consumed in comparison to that of the process shown in FIG. 4B.

The process of FIG. 12 begins with step 1201. In step 1201, the manager 305 receives digests from one or more devices currently rendering, transmitting, presenting, and/or recording content. Specifically, only one or more selected devices sends digests to the manager 305 when the digests are generated from the content. The manager 305 adds the digests that are received from the selected devices to the digest feed, which may be implemented with any type of storage medium. Meanwhile, the remaining devices (e.g., gateways 111) may delay sending their digests pending the results of a comparison.

The one or more devices that are selected to send the digests may be randomly chosen or may be the first N (where N is any positive integer) devices that send digests. In another method for selecting devices for sending digests to the digest feed, the devices may wait a period of time before sending the digests. During the waiting period a device may compare its digests with digests received from the digest feed. And, if the device finds a match the device will refrain from sending its digests, otherwise the device will send its digests. A device may also determine from previous comparisons that its digests are likely to be in the digest feed before deciding whether or not to send its digests to the digest feed.

Next, in step 1202, the manager 305 transmits (e.g., broadcasts or multicasts) one or more digests from the digest feed to those devices that have delayed sending their digests. In other words, the manager 305 may transmit the digests to those devices that are different than the devices from which the digests were received in step 1201. Thus, the same digests in the digest feed may be transmitted to more than one device. Further, in some embodiments, the manager 305 does a preliminary comparison, so that it only transmits unique digests from the digest feed. In some other embodiments, the manager 305 does a preliminary comparison, so that it only transmits digests in the digest feed that are unique within some predetermined period of time. For example, the manager 305 may be configured to broadcast only digests in the digest feed that are not the same as other digests that have been in the digest feed within the last minute.

Then in step 1203, each device that receives one or more of the transmitted digests determines whether the received digests match digests generated by that particular device. In other words, a device may compare digests that were transmitted by the manager 305 with digests that it generated using its own digest generator 303. Herein, the device may determine that there is a match if just one pair of digests match or may only determine that there is a match if a predetermined number of pairs of digests match (either consecutively or non-consecutively). The comparison may be performed a number of times until a predetermined time limit or a random time limit is reached. Additionally, or alternatively, the comparison may be performed a number of times until the free space in the local cache 302 is less than a predetermined size. Thus, step 1203 may be performed simultaneously in a number of different devices. Each of these devices may generate its own digests using a digest generator 303 and store its own digests in a local cache 302 instead of sending its digests, so that its digests are available for comparison with the digests received from the manager 305.

If a match is not detected in step 1203, the process proceeds to step 1204. In step 1204, a device that determines that digests received from the manager 305 do not match its own generated digests then sends the content to the manger 305 to be stored in the network storage 308.

If a match is detected in step 1203, the process proceeds to step 1205. In step 1205, the device may refrain from sending the content (e.g., recorded content) to the manager 305. A match would indicate that the manager 305 already has the recorded content, and thus, there is no reason for the device to send the recorded content upstream to the manager 305. In this manner, the manager 305 and device operate together to avoid duplication of recorded content. In this process, the device also does not have to transfer digests upstream to the manager 305 when it determines that there is a match. However, in some embodiments, digests may be transferred upstream along with a flag to indicate that the recorded content associated with the particular digest is already present in the storage 308.

Further, in some embodiments, when a match is detected, a device may send information instructing the manager 305 to save certain portions of the recorded content. For example, the device may send information indicating that segments 5 through 105 of a particular recorded content should be stored in an index specific to the device or user of the device or should be stored in a manifest file that points to the previously stored recorded content. The information may comprise digests and flags associated with the particular recorded content that is desired to be stored.

The processes described above may be further optimized based on a history of the devices from which the compared digests are received. In some embodiments, the manager 305 may maintain a history of each device and may group together devices that have a history of recording the same content. In other words, the manager 305 may track the content or digests received from the devices to detect which devices have a history of recording the same content. When the manager 305 detects that two or more users have a history of recording the same content, then the manager 305 may change the frequency of comparing digests or frequency of generating digests. For example, step 405 in FIG. 4B may be optimized to compare every $10^{th}$ digest received when the digests being compared are from devices that have a history of recording the same content, and therefore, have a history of sending similar digests. Or, for example, the manager 305 may instruct the devices to generate fewer digests, such as one digest for five minutes of content rather than one digest for every minute of content, when the manager 305 detects that the devices sending the digests belong to a common group (e.g., have a history of recording the same content). Also, where the frequency of generating digests is changed in response to the history of the devices, the change in frequency may take place in just one or several of the devices of the same group. For example, if ten devices are in a common group and are sending digests, one device may generate digests at one rate (e.g., one digest per 30 seconds of content) while the remaining nine devices generate digests at a reduced rate (e.g., one digest per minute of content). Furthermore, the changes to the frequency of comparing digests or the frequency of generating digests may be proportional to the similarities in history of the devices providing the digests.

Figure 13:
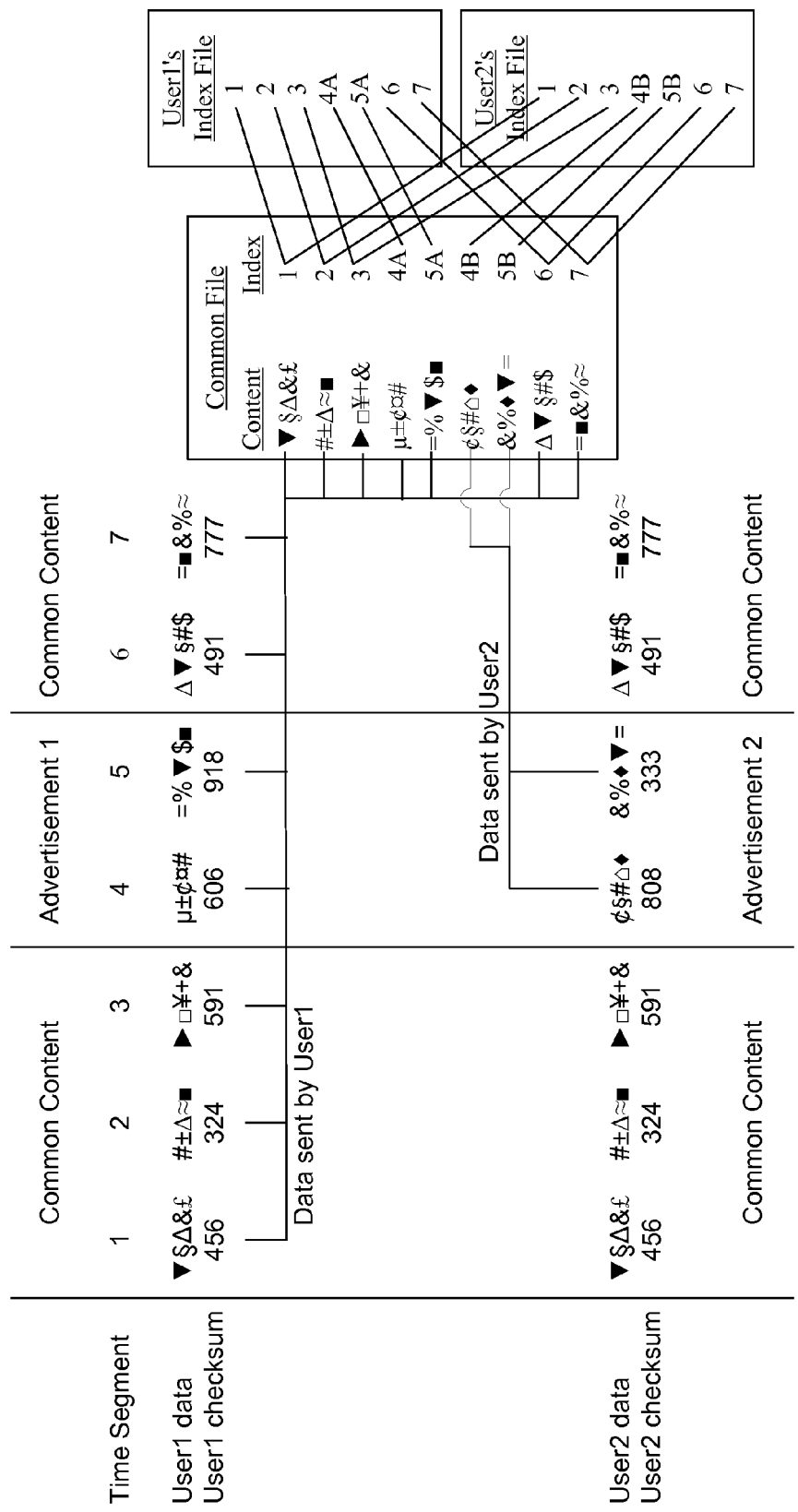
FIG. 13 illustrates an example process for storing recorded content.
Figure 14:
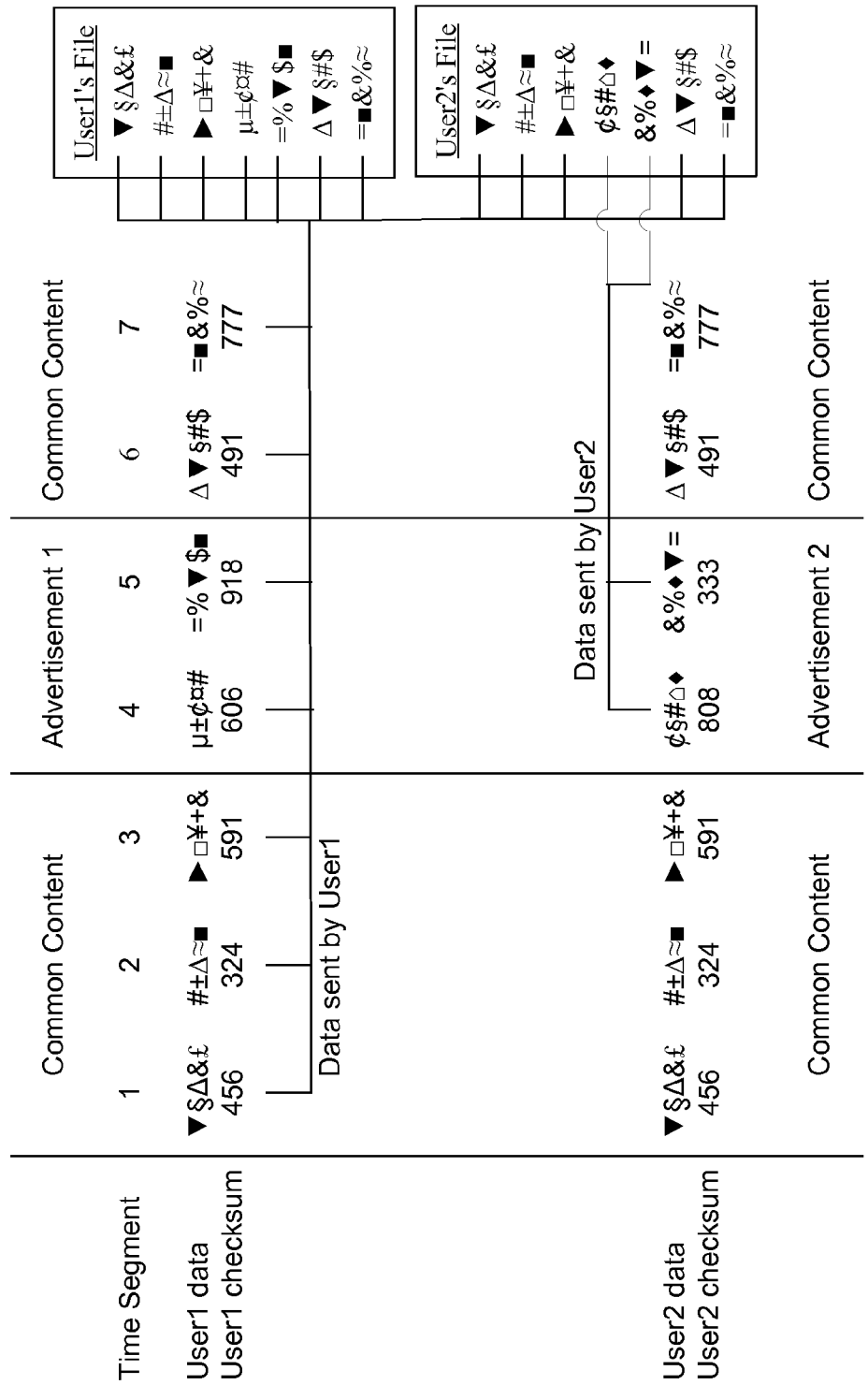
FIG. 14 illustrates another example process for storing recorded content.

FIGS. 13 and 14 illustrate two examples of how content may be stored within the storage 308. As shown in FIG. 13, an index file may be created for each device (e.g., gateway 111) or for each user (in cases where a user may be associated with more than one device). The index files may be manifest files created by the manager 305. Each index file may include pointers to content stored in a common file within the storage 308. The example in FIG. 13 shows a scenario in which two different users (User 1 and User 2) record similar content (e.g., same TV program). Specifically, the two users record the same common content, which includes content in segments 1-3,6, and 7, but record two different advertisements (Advertisement 1 and Advertisement 2), which include content in segments 4 and 5. The manager 305 may be able to distinguish the common content from the advertisements based on the checksums generated for different segments. In this scenario, the common content is stored only once in the common file. Additionally, the common file may also store both advertisements. Further, User 1's index file may be updated to include pointers to the common content and the Advertisement 1 stored in the common file. Meanwhile, User 2's index file may be updated to include pointers to the common content and the Advertisement 2. Using the corresponding index files, User 1 and User 2 can retrieve a copy of the content stored in the common file when they wish to playback the recorded content.

Referring to FIG. 14, in another example, the common content may be stored in each user's content file. More specifically, the manager 305 may receive the common content from User 1 and store this content in both User 1's content file and User 2's content file. Still, only User 1 sends the common content to the manager 305 to be stored. And, User 2 only sends the advertisement content (Advertisement 2) that differs from the advertisement content of User 1. In this case, although the common content is stored twice in the storage 308, this process of storing the common content may be quicker and may use less bandwidth than a process in which all of the recorded content is sent by each of the users.

The various features described above are merely nonlimiting examples, and can be rearranged, combined, subdivided, omitted, and/or altered in any desired manner. For example, features of the manager 305 can be subdivided among multiple processors and computing devices. The true scope of this patent should only be defined by the claims that follow.

I claim:

1. A method, comprising:
receiving, at a computing device from a first user device remote from the computing device, one or more first digests derived from content;
comparing, by the computing device, the one or more first digests with one or more second digests to determine whether the one or more second digests are also derived from the content, wherein the one or more second digests originate from a second user device remote from the computing device;
retrieving, by the computing device, at least a portion of the content based on a result of the comparing, if the content is not presently stored in a storage of the computing device; and
storing the retrieved at least the portion of the content in the storage of the computing device.

2. The method of claim 1, further comprising:
receiving a request from the first user device for the at least the portion of the content stored in the storage of the computing device;
copying the at least the portion of the content, stored in the storage of the computing device, from the storage of the computing device in response to the request for the at least the portion of the content stored in the storage of the computing device; and
transmitting the copy of the at least the portion of the content stored in the storage of the computing device to the first user device,
wherein the retrieving the at least the portion of the content comprises retrieving the at least the portion of the content from the first user device based on the result of the comparing.

3. The method of claim 1, further comprising comparing the one or more first digests with one or more additional digests originating from one or more additional user devices, which are remote from the computing device.

4. The method of claim 1, wherein retrieving the at least the portion of the content comprises retrieving the at least the portion of the content from the first user device in response to determining that the one or more first digests and the one or more second digests are derived from different content if the content is not presently stored in the storage of the computing device.

5. The method of claim 1, further comprising comparing the one or more first digests with one or more additional digests derived from recorded data stored in the storage.

6. The method of claim 1, further comprising:
selecting one of the first user device and the second user device upon determining that the one or more second digests are also derived from the content, wherein the at least the portion of the content is retrieved from the selected one of the first user device and the second user device; and instructing an unselected one of the first user device and the second user device to not transmit the content to the computing device.

7. The method of claim 1, further comprising:

selecting both the first user device and the second user device upon determining that the one or more second digests are also derived from the content, wherein retrieving the at least the portion of the content comprises retrieving a first portion of the content from the first user device and a second portion of the content from the second user device, the first portion being different from the second portion.

8. The method of claim 7, further comprising:

setting a first size of the first portion of the content and a second size of the second portion of the content based on a first bandwidth of the first user device and a second bandwidth of the second user device.

9. The method of claim 1, wherein receiving the one or more first digests comprises receiving the one or more first digests that are generated by selecting one or more pieces of the content according to one or more specific timestamps and performing an algorithm on data of the one or more selected pieces of the content to generate the one or more first digests, respectively.

10. The method of claim 9, wherein performing the algorithm is comprises performing an MD5 message-digest algorithm.

11. The method of claim 1, wherein receiving the one or more first digests comprises receiving the one or more first digests that are generated by selecting one or more segments of the content, detecting one or more motion vectors in each of the one or more selected segments, and setting one or more of the detected motion vectors as the one or more first digests, respectively.

12. The method of claim 1, wherein receiving the one or more first digests comprises receiving the one or more first digests that are generated by selecting one or more segments of the content, converting the one or more segments into one or more highly-quantized images, and setting the one or more highly-quantized images as the one or more first digests, respectively.

13. The method of claim 1, wherein the comparing of the one or more first digests with the one or more second digests comprises determining that the one or more second digests are also derived from the content where all of the one or more first digests are equal to the one or more second digests, respectively.

14. The method of claim 1, wherein the comparing of the one or more first digests with the one or more second digests comprises determining that the one or more second digests are also derived from the content where a subset of the one or more first digests are equal to the one or more second digests, respectively.

15. A non-transitory computer-readable medium having instructions stored thereon that, when executed by a processor, cause a computing device to perform a method, comprising:

receiving one or more first digests, representing first content, from a first user device remote from the computing device;

receiving one or more second digests, representing second content, from a second user device remote from the computing device; and comparing the one or more first digests with the one or more second digests to determine whether the first content corresponds to the second content.

16. A computing device, comprising:

a processor; and memory storing computer-executable instructions that, when executed by the processor, cause the computing device to:

receive one or more first digests associated with first content from a first remote user device;

receive one or more second digests associated with second content from a second remote user device; and compare the one or more first digests with the one or more second digests to determine whether the first content corresponds to the second content.

17. The computing device of claim 16, further comprising:

a storage; and an interface configured to connect the computing device to a network, wherein the computer-executable instructions, when executed, further cause the computing device to:

receive a request from the first remote user device for at least a portion of content stored in the storage;

copy the at least the portion of the content from the storage in response to the request for the at least the portion of the content; and transmit a copy of the at least the portion of the content to the first remote user device.

18. The computing device of claim 17, wherein the first remote user device and the second remote user device are connected to the computing device via the network, wherein the first remote user device is configured to receive the first content to be recorded, to generate the one or more first digests using the first content, and to transfer the one or more first digests to the computing device, and wherein the second remote user device is configured to receive the second content to be recorded, to generate the one or more second digests using the second content, and to transfer the one or more second digests to the computing device.

19. The computing device of claim 18, wherein the storage stores:

a common file comprising the at least the portion of the content;

a first index file corresponding to the first remote user device; and a second index file corresponding to the second remote user device, wherein the computer-executable instructions further cause the computing device to:

retrieve advertising content from the second remote user device;

store the advertising content in the common file; and store a pointer in the second index file to point to the advertising content stored in the common file.

* * * * *

UNITED STATES PATENT AND TRADEMARK OFFICE
CERTIFICATE OF CORRECTION

PATENT NO.         : 8,805,163 B2
APPLICATION NO.    : 13/354791
DATED              : August 12, 2014
INVENTOR(S)        : Arun V. Rajagopalan It is certified that error appears in the above-identified patent and that said Letters Patent is hereby corrected as shown below:

In the claims

Column 20, Claim 4, Line 58:
 After "content", insert --,--

Column 21, Claim 10, Line 29:
 After "algorithm", delete "is"

Signed and Sealed this
Second Day of February, 2016

Michelle K. Lee
*Director of the United States Patent and Trademark Office*